Nov. 22, 1949　　　E. C. GRAFF ET AL　　　2,488,663
APPLICATOR FOR INSECTICIDES
Filed April 10, 1945
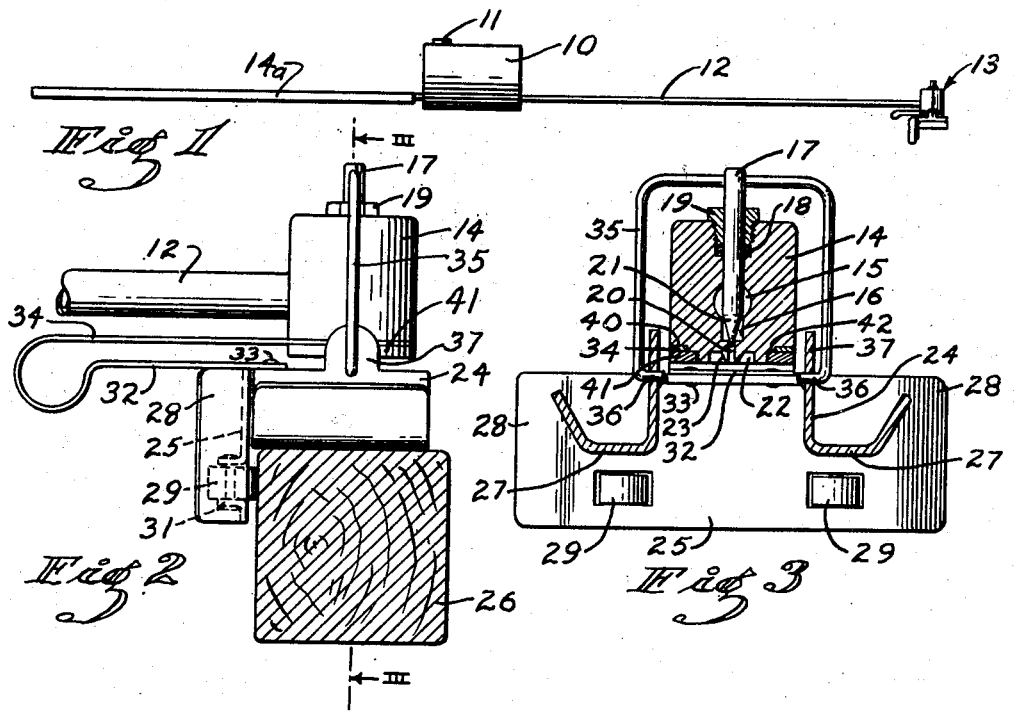
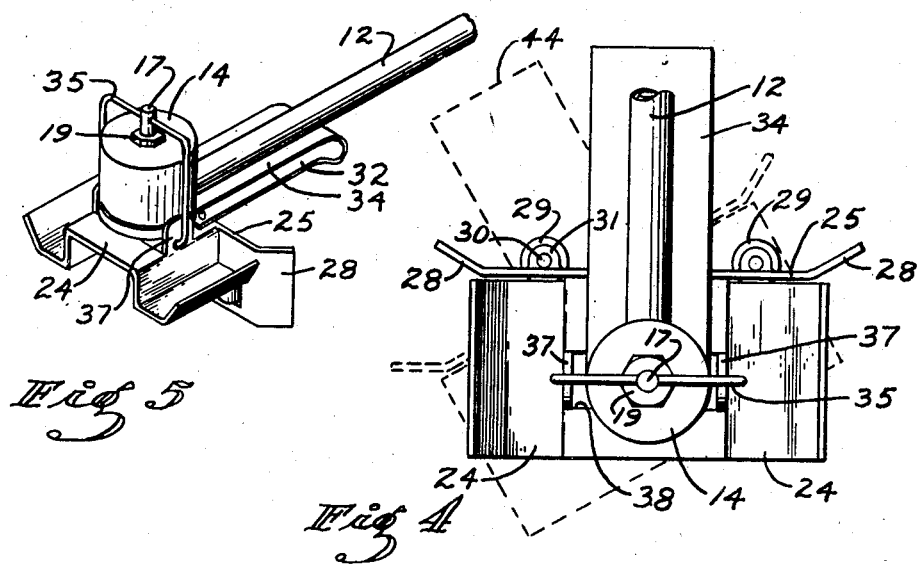
INVENTORS
EDWIN C GRAFF
& FREDERICK H MILLER
BY
Charles M Fryer
ATTORNEY Patented Nov. 22, 1949

2,488,663

UNITED STATES PATENT OFFICE 2,488,663

APPLICATOR FOR INSECTICIDES

Edwin C. Graff and Frederick H. Miller, Napa, Calif., said Miller assignor to said Graff Application April 10, 1945, Serial No. 587,576

4 Claims. (Cl. 91—30)

The present invention relates to applicators for insecticides, and particularly to a device for use in applying insecticides or the like to the roosting places of fowl.

It is current practice in the chicken industry in order to combat vermin, such as mites and lice, which are harbored in the feathers of the birds, to apply an insecticide of volatile nature to the roosts upon which the birds perch at night. An insecticide commonly used for this purpose is nicotine sulphate. A small quantity of nicotine sulphate is deposited upon the top surfaces of the roosts just before the birds roost for the night. The heat from the body of the roosting fowl is relied upon to hasten the vaporization of the insecticide and the resultant vapors penetrate the feathers and destroy the vermin harbored among them and on the body of the fowl.

Several difficulties are encountered in this method of combating vermin. For example, the volatile insecticide must be applied in haste because it must be present on the roosts in just the right quantity and just before the chickens go to roost in order to be most effective. The insecticide is a costly liquid which is applied sparingly to avoid waste and also to prevent too abundant an application which results in the chickens refusing to roost because of the obnoxious nature of the vapor. One method commonly practiced for applying the insecticide to the roosts, which are usually in the form of wooden bars of rectangular cross section, is to use a common oil can with a tapered spout and to pass the open end of the spout along the top of the roost. This results in the application of a narrow line of liquid along the roost which, if skillfully applied under suitable temperature conditions, constitutes an adequate application. This, however, is a difficult and time consuming operation as the roosts are usually arranged in rows or tiers over a network of wire or the like which separates the chickens from the area where the droppings are received beneath the roosts. Consequently, the workman applying the insecticide must climb over the roosts and work in awkward and inefficient positions. Another disadvantage of conventional methods of application arises from the fact that roosts are often coated with a deposit of oily dust-like particles from the feathers of the chickens, with the result that the surface of the roosts tend to repel the liquid insecticide and cause it to form small globules which roll off the edges of the roosts.

Among the objects of the present invention, therefore, are the provision of a device which overcomes the foregoing and other disadvantages in applying insecticides or the like to roosts or other similar places, the provision of an applicator by means of which a workman can easily and efficiently apply a uniform quantity of liquid to a desired surface without waste of the liquid and with a minimum expenditure of time and effort, and the provision of a device by means of which insecticide in liquid form can readily be applied and caused to adhere to a surface of dusty or liquid repelling nature. Further and more specific objects and advantages of the invention are made apparent in the following specification wherein one form of the invention is disclosed in detail with reference to the accompanying drawings.

The invention is described herein in connection with a form designed for the application of liquid insecticide to the roosts of chickens or other fowl, but it is not limited to such specific use and its adaptability to various other uses will be apparent as the description proceeds.

In the drawings,

Fig. 1 is a view in side elevation of an applicator for insecticides which embodies the present invention, Fig. 2 is a similar elevation on a large scale of the head portion only of the applicator shown in Fig. 1 with the same in position for operation on a roost which is illustrated in section, Fig. 3 is a sectional view taken on the line III—III with the roost removed, Fig. 4 is a plan view of the portion of the applicator shown in Figs. 2 and 3 and also illustrating in dotted lines an angular position which may be assumed by the head portion of the applicator in operation, and Fig. 5 is an isometric view of the head portion illustrated in Figs. 2 to 4 inclusive.

The applicator, as illustrated in Fig. 1, comprises a reservior in the form of a can-like container provided with a capped opening 11 through which liquid may be introduced to charge the device for use. A hollow tubular forwardly extending arm 12 supports an applicator head generally indicated at 13 at its forward end and forms a communicating conduit between the reservoir 10 and the head 13. Suitable straining devices, not shown, may be employed at any convenient point to prevent the passage of any solid particles, accidentally included in the resevoir 10, through the tube 12 and into the head 13. A handle 14a extends rearwardly from the reservoir 10 and provides considerable over-all length to facilitate the application of insecticide by the head 13 to roosts which would otherwise be difficult to reach. The long wand-like assembly which is thus provided is balanced by the substantial central positioning of the weight of liquid contained by the reservoir, and a workman applying insecticides to roosts can easily stand on the floor of a chicken house and reach across several rows of roosts to contact the head 13 with each roost and slide it along the roost to effect distribution of a uniform quantity of liquid on the surface of the roost.

The details of construction of the applicator head 13 with its guiding and operating mechanism are shown in Figs. 2 to 5 inclusive, wherein a valve body 14 is shown as rigidly secured to the end of the tube 12. The valve body 14 may be threaded or otherwise suitably secured to the tube and contains a transverse bore shown at 15 in Fig. 3, which forms means for communicating liquid from the interior of the tube to a central vertical bore 16 in the valve body which receives a valve stem 17 mounted therein for vertical reciprocation. The bore 16 is enlarged and threaded at its upper end for the reception of packing shown at 18 and a packing gland 19 of conventional construction. At its lower end, the bore 16 communicates with a restricted passage 20, and a lower tapered end 21 on the valve stem is adapted to enter and close the upper end of the restricted passage 20 normally to prohibit the flow of liquid from the reservoir 10 through the tube 12 and out through the passage 20. The bottom of the valve body 14 is preferably provided with an annular groove 22 concentric with and surrounding the discharge end of the passage 20 and inclined at its inner wall to provide a tapered tip-like member 23 at the point of liquid discharge. This prevents the discharged liquid from spreading over the bottom of the valve body, and thereby effects direct transfer of the liquid to the surface of the object upon which it is intended to be deposited.

Guide means are provided to facilitate movement of the valve assembly over a roost or the like, and comprise a top runner 24 engageable with the top of the roost and an edge runner 25 engageable with the front edge of the roost. In operation, the runners 24 and 25 assume the positions illustrated in Fig. 2 wherein a typical roost is shown in cross section at 26. The top runner 24 comprises a plate of metal or the like bent downwardly, outwardly and upwardly at its opposite ends to provide a pair of spaced roost engaging surfaces 27. The edge runner 25 comprises a similar plate or preferably an integral portion of the same plate bent to assume a position at a right angle to the plate 24, and preferably having its opposite ends 28 bent rearwardly at an angle sufficient to prevent their engagement with the roost. The edge runner 25 should ride freely over the forward edge of the roost and is therefore advantageously provided with a pair of rollers 29, journalled on pins 30, supported between brackets 31 which may be formed by punching and bending back the material of which the plate 25 is formed. The rollers 29 are arranged to protrude through the face of the plate 25 as illustrated in Fig. 2 to engage the forward edge of the roost to facilitate travel of the guides along the roost.

The entire guide assembly, which includes the runners 24 and 25, is supported by the lower arm 32 of a spring which may be rigidly secured to the top runner 24 as by rivets 33. An upper arm 34 of the same spring is carried by the valve body 14 by a connection which permits it to swivel with respect thereto in a manner and for a purpose which will presently appear. The spring which comprises the arms 32 and 34, therefore, forms a resilient support between the valve body and the guide members, and as the spring is tensioned for spreading action, it tends to swing the guide members downwardly with relation to the valve body. This tendency of the guide members to move downwardly maintains the valve normally in a closed position through the following mechanism. The top runner of the guide assembly is connected by a bail 35 with the valve stem 17, and this bail, as illustrated in Fig. 3, passes through the valve stem adjacent its upper end and has inturned ends 36 which extend through suitable perforations in lugs 37 which are bent upwardly from a central punched out portion of the top runner 24. The formation of the lugs 37 also provides an opening 38 which extends across the top runner 24 directly beneath the valve to permit liquid discharging through the passage 20 to fall directly on the top on the roost which is engaged by the top runner. Through the medium of the bail 35, the guide assembly is connected with the valve stem to cause the stem to move downwardly to its closed position under the influence of the spring arms 32 and 34. Thus, the valve is normally closed as illustrated in Fig. 3 but when the guide assembly is brought into the roost contacting position illustrated in Fig. 2, the weight of the forward end of the applicator serves to compress the spring arms 32 and 34 and thus to raise the guide assembly with respect to the valve body 14. Consequently, the bail 35 is also raised and withdraws the valve stem 17 from its seated position with the result that liquid from the reservoir 10 flows through the tube 12 and the orifice 15 and is discharged through the passage 20 onto the surface of the roost which is engaged by the guide assembly. The operator then slides the assembly along the roost to deposit a small quantity of liquid throughout its length. During this sliding movement, the roost contacting surfaces 27 of the top runner pass over the deposited liquid immediately smearing it and assuring its proper distribution on the roost even though the surface thereof is coated with a powdery or oily substance which is not readily receptive to the deposit of free liquid.

In order that the operator may stand in one position while applying liquid insecticide to the full length of a long roost, the guide assembly is connected with the valve body 14 by a swivel connection which permits the guide assembly to rotate with relation to the valve head and its tubular support 12. This swivel is provided at the connection of the upper spring leaf 34 with the valve body, as is illustrated in Fig. 3, wherein the valve body is shown as provided with a shoulder 40 which is formed annularly and concentric with the valve body and which receives the forward end of the spring leaf which is perforated for that purpose. A nut 41 is threaded to the lower end of the valve body to hold the spring in place thereon and the nut engages a shoulder 42 which is provided to insure sufficient clearance between the nut and the shoulder 40 to permit free swinging movement of the spring. As a consequence of this swivel connection, the spring and the entire guide assembly is permitted to swing with respect to the tubular handle 12 to positions such as that illustrated in dotted lines at 44 in Fig. 4. The operator may therefore simply pass the guide assembly along a roost and the guide assembly will maintain its proper alignment with the roost even though the handle 12 is disposed at various angles with relation to the roost.

With the insecticide applicator herein described, a uniform quantity of liquid may be applied to a roost or a similar surface and is quickly smeared or wiped onto the surface of the roost during its application. As the application is uniform in quantity, there is very little waste of the insecticide and waste is further prevented by the fact that the emission of the insecticide is controlled by a valve which opens automatically when the guide assembly contacts a roost, and closes automatically and instantaneously upon termination of contact with the roost.

While the present invention is more or less specifically described herein for purposes of illustration, it is not intended to be limited by this description, but is limited only by the terms of the appended claims.

We claim:

1. A device for applying liquid insecticide to roosts or the like which comprises a reservoir for liquid, a valve controlling flow of liquid from the reservoir, guide means engageable with a roost to position the valve over the roost, and means connecting the valve and guide means to open the valve when the guide means contacts the roost and close the valve when the guide means is out of contact with the roost.

2. A device for applying liquid insecticide to a roost or the like which comprises a valve for controlling flow of the liquid, guide means engageable with the roost to position the valve over the roost, a valve operating connection between the valve and the guide, and a resilient connection between the valve and the guide normally holding the valve closed but causing the valve to open when the guide contacts the roost.

3. A device for applying liquid insecticide to a roost or the like which comprises a valve for controlling flow of the liquid, guide means engageable with the roost to position the valve over the roost, a valve operating connection between the valve and the guide, and a resilient connection between the valve and the guide normally holding the valve closed but causing the valve to open when the guide contacts the roost, said connections between the valve and guide including means to permit the guide to swivel with respect to the valve.

4. A device for applying liquid insecticide to a roost or the like comprising a reservoir for liquid, an elongated tubular member extending forwardly from the reservoir, a discharge valve at the end of said member and communicating with the reservoir therethrough, guide means adjacent the discharge valve to position the valve over a roost, means normally holding the valve closed, and means for opening the valve upon engagement of the guide means with the roost.

EDWIN C. GRAFF.
FREDERICK H. MILLER.

REFERENCES CITED

The following references are of record in the file of this patent:

UNITED STATES PATENTS

| Number | Name | Date |
| --- | --- | --- |
| 242,327 | Jewell | May 31, 1881 |
| 1,758,300 | Van Dresser | May 13, 1930 |
| 2,082,414 | Munford | June 1, 1937 |